United States Patent [19]

Ridley et al.

[11] Patent Number: 4,709,176

[45] Date of Patent: Nov. 24, 1987

[54] MAGNETIC BATTERY

[76] Inventors: William E. Ridley, 724 Western Ave., Topeka, Kans. 66606; George Spector, 233 Broadway RM 3815, New York, N.Y. 10007

[21] Appl. No.: 891,140

[22] Filed: Jul. 31, 1986

[51] Int. Cl.[4] ............................................. H02K 35/00
[52] U.S. Cl. ......................................... 310/15; 310/30
[58] Field of Search ..................................... 310/15, 30

[56] References Cited

U.S. PATENT DOCUMENTS

| 3,968,387 | 7/1976 | Scarff | 310/304 |
| 4,114,305 | 9/1978 | Wohlert et al. | 310/154 |
| 4,140,932 | 2/1979 | Wohlert | 310/304 |
| 4,191,893 | 3/1980 | Grana | 310/304 |

Primary Examiner—Donovan F. Duggan

[57] ABSTRACT

A magnetic battery is provided that includes a helical spring threaded onto a mnagnetic core to increase relative movement between the magnetic core and coils that may be coated with sulfer and zinc oxide to enhance electricity extracted therefrom. The magnetic battery is built into a flashlight casing so that oscillatory motion will provide electricity to operate a lamp therein.

5 Claims, 5 Drawing Figures

U.S. Patent  Nov. 24, 1987  4,709,176

MAGNETIC BATTERY

BACKGROUND OF THE INVENTION

The instant invention relates generally to apparatuses for generating electricity, and more specifically it relates to a magnetic battery.

Numerous apparatuses for generating electricity have been provided in prior art that are adapted to convert mechanical energy into electrical pulses. For example U.S. Pat. Nos. 3,453,573; 3,696,251 and 4,140,932 all are illustrative of such prior art. While these units may be suitable for the particular purpose to which they address, they would not be as suitable for the purposes of the present invention as heretfore described.

SUMMARY OF THE INVENTION

A primary object of the present invention is to provide a magnetic battery that will overcome the shortcomings of the prior art devices.

Another object is to provide a magnetic battery that is built into a flashlight casing so that oscillatory motion will provide electricity to operate the lamp therein.

An additional object is to provide a magnetic battery that has a helical spring threaded onto a magnetic core to increase relative movement between the magnetic core and coils.

A further object is to provide a magnetic battery that is simple and easy to use.

A still further object is to provide a magnetic battery that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
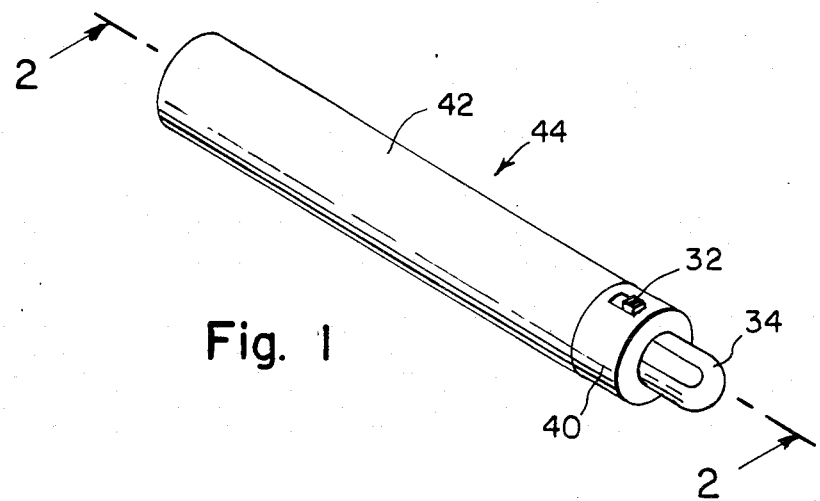
FIG. 1 is a perspective view of the invention.

Turning now descriptively to the drawings, in which similar reference characters denote similar elements throughout the several views, FIGS. 2 through 5 illustrates a magnetic battery 10 that consists of a non-magnetic, non-conductive housing 12 having closed ends 14. A helical spring 16 is slideably disposed in the housing 12. A rippled polarized magnetic core 18 is threaded into the helical spring 16 for uninterrupted movement through the housing 12 in direction of polar axis of the magnetic core 18 in which the spring 16 will increase the movement therethrough.

First and second coils 20 and 22 are disposed in spaced relationship on the housing 12 so that the spring 16 and the magnetic core 18 moves sequentially through the coils 20 and 22 when sliding through the housing from one of the closed ends 14 to other of the closed ends 14. The coils 20 and 22 are wound in mutually opposite directions connected together in series and may be coated with sulfer and zinc oxide to enhance electricity extracted therefrom. The magnetic core 18 has an effective polar length greater than distance between the coils 20 and 22 and less than distance between outer ends of the coils. The distance between the outer ends of the coils and adjacent closed ends 14 of the housing 12 are at least as great a length of the magnetic core 18.

Figure 4:
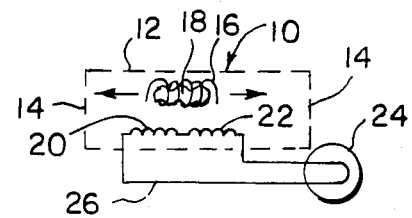
FIG. 4 is an electrical diagram of a simple circuit of the invention.

As shown in FIG. 4 a lamp 24 is connected across the series connection of the coils 20 and 22 forming a complete electrical circuit 26 thereof whereby the magnetic battery 10 provides electricity when oscillated to light the lamp 24 in a blinking fashion.

Figure 2:
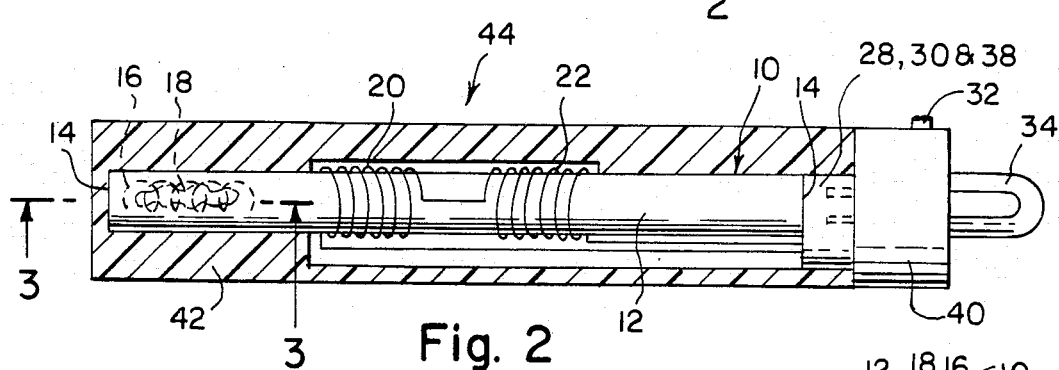
FIG. 2 is an enlarged cross sectional view taken along line 2—2 in FIG. 1 showing the internal structure therein.
Figure 3:
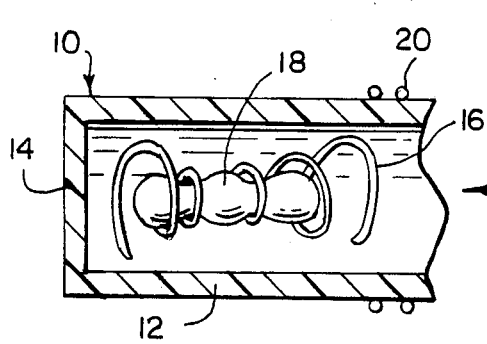
FIG. 3 is an enlarged cross sectional view taken along line 3—3 in FIG. 2 showing the magnet with spring inside the non-magnetic housing.
Figure 5:
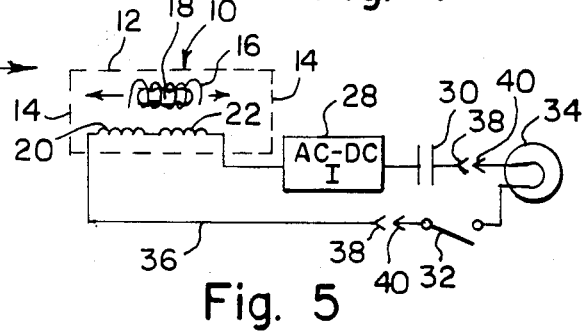
FIG. 5 is an electrical diagram of the invention.

As shown in FIGS. 2 and 5 an AC to DC inverter 28 is connected into the series connection of the coils 20 and 22. A capacitor 30 is electrically connected to the inverter 28 and into the series connection of the coils. An on-off switch 32 is connected into the series connection of the coils. A lamp 34 is connected across the series connection of the coils 20 and 22 between the capacitor 30 and the switch 32 forming a complete electrical circuit 36 thereof. When the switch 32 is in the on position the magnetic battery 10 will provide electricity when oscillated to light the lamp 36 continuously.

A female socket 38 is connected into the electrical circuit 36 and a male plug 40 is electrically connected to the lamp 34 and switch 32. The male plug 40 can be plugged into and removed from the female socket 38.

As best seen in FIGS. 1 and 2 an elongated casing 42 encompasses the housing 12, the coils 20 and 22, the inverter 28, the capacitor 30 and part of the female socket 38. When the male plug 40 is plugged into the female socket 38 complete unit can be used as a flashlight 44.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A magnetic battery comprising:
  (a) a non magnetic, non conductive housing having closed ends;
  (b) a helical spring slideably disposed in said housing;
  (c) a rippled polarized magnetic core mounted in said helical spring for reciprocating movement through said housing along the polar axis of said magnetic core in which said spring will increase said movement therethrough; and
  (d) first and second coils disposed in spaced relationship on said housing so that said spring and magnetic core moves sequentially through said coils when sliding through said housing from one of said closed ends to other of said closed ends, said coils being wound in mutually opposite directions, connection together in series, said magnetic core having an effective polar length greater than distance between said coils and less than distance between outer ends of said coils and distance between said outer ends of said coils and adjacent said closed ends of said housing being at least as great as length of said magnetic core.

2. A magnetic battery as recited in claim 1, further comprising a lamp connected across said series connection of said coils forming a complete electrical circuit thereof whereby said magnetic battery provides electricity when oscillated to light said lamp in a blinking fashion.

3. A magnetic battery as recited in claim 1, further comprising:
   (a) an AC to DC inverter connected into said series connection of said coils;
   (b) a capacitor electrically connected to said inverter and into said series connection of said coils;
   (c) an on-off switch connection into said series connection of said coils; and
   (d) a lamp connected across said series connection of said coils between said capacitor and said switch forming a complete electrical circuit thereof so that when said switch is in on position said magnetic battery will provide electricity when oscillated to light said lamp continuously.

4. A magnetic battery as recited in claim 3, further comprising a socket in said circuit and a plug connected to said lamp, an elongated casing to encompass said housing, said coils, said inverter, said capacitor and part of said socket so that when said male plug is plugged into said female socket for use as a flashlight.

5. A battery as in claim 1, wherein said core is threadedly mounted in said spring.

\* \* \* \* \*